(12) United States Patent
Deisinger (10) Patent No.: US 7,607,986 B2
(45) Date of Patent: Oct. 27, 2009

(54) CONVOLUTED BOOT ASSEMBLY (75) Inventor: Markus Deisinger, Siegburg (DE)

(73) Assignee: GKN Driveline International GmbH, Lohmar (DE)

( * ) Notice: Subject to any disclaimer, the term of this patent is extended or adjusted under 35 U.S.C. 154(b) by 416 days.

(21) Appl. No.: 10/557,505

(22) PCT Filed: May 8, 2004

(86) PCT No.: PCT/EP2004/004938

§ 371 (c)(1),
(2), (4) Date: Jul. 27, 2006

(87) PCT Pub. No.: WO2004/104438

PCT Pub. Date: Dec. 2, 2004

(65) Prior Publication Data

US 2007/0042827 A1    Feb. 22, 2007

(30) Foreign Application Priority Data

May 21, 2003   (DE) ............................... 103 22 902

(51) Int. Cl.
*F16D 3/84* (2006.01)
(52) U.S. Cl. ..................................... 464/175
(58) Field of Classification Search .............. 464/111, 464/173–175, 905
See application file for complete search history.

(56) References Cited

U.S. PATENT DOCUMENTS

| 4,280,340 A | 7/1981 | Goguet |
| 4,320,632 A | 3/1982 | Dore |
| 5,529,538 A | 6/1996 | Schulz et al. |
| 5,900,205 A | 5/1999 | Sadr et al. |
| 6,832,763 B2 | 12/2004 | Huchet et al. |
| 6,966,838 B2 * | 11/2005 | Herchenbach et al. .. 464/175 X |

FOREIGN PATENT DOCUMENTS

| DE | 101 53 822 C1 * | 4/2003 |
| EP | 0 915 264 A2 | 5/1999 |
| JP | 10110738 A | 4/1998 |

* cited by examiner

*Primary Examiner*—Greg Binda
(74) *Attorney, Agent, or Firm*—Rader, Fishman & Grauer, PLLC (57) ABSTRACT

The invention relates to a convoluted boot which serves to seal an annular gap between an outer joint part of a tripode joint and a shaft connected to the inner joint part of the tripode joint. The convoluted boot 1 comprises an elastic adapter ring 2 for being attached to the outer joint part and a boot portion 3 connected thereto and extending between the adapter ring 2 and a collar 5 for being fixed to the shaft. The adapter ring 2 comprises a cylindrical outer face 10 and an inner face 8 whose cross-section is adapted to the outer contour of the outer joint part and which is form-fittingly positioned on the outer joint part. At least in partial regions of the wall formed between the inner face 8 and the outer face 10, there is provided a plurality of holes 12 which start from an end face or radial face of the adapter ring and are arranged to form a honeycomb-like structure.

8 Claims, 7 Drawing Sheets

CONVOLUTED BOOT ASSEMBLY

BACKGROUND OF THE INVENTION

The invention relates to a convoluted boot assembly having a longitudinal axis A for sealing an annular gap between an outer joint part of a tripode joint and a shaft connected to an inner joint part of the tripode joint. At their aperture end, on the outer circumference, outer joint parts of tripode joints have a clover-leaf shape, i.e. in accordance with the tripode arms and the roller assemblies of the inner joint part. They comprise three raised portions and three recesses which are distributed around the circumference with identical pitch angles. They therefore do not meet the preconditions for directly slipping on rotationally-symmetrical, i.e., round convoluted boots.

This is the reason why it is common practice to use convoluted boots which comprise an adapter ring and a boot portion connected thereto. The adapter ring can be slipped by means of a correspondingly designed inner face on to the clover-leaf-shaped outer face of the outer joint part.

DE 101 23 216 A1 shows such a convoluted boot assembly wherein the adapter ring is connected to the boot portion by thermal welding or by gluing. The adapter ring is provided with uniformly circumferentially distributed regions with radial thickenings. Because of these accumulations of masses, it is possible, during the production of the adapter ring, for there to occur indentations and shrink holes. Furthermore, such accumulations of masses lead to uneven cooling rates of the adapter ring, as a result of which different shrinkage rates lead to an increase in the distortion tendency.

From EP 0 915 264 A2 there is known a convoluted boot assembly which is produced by blow molding and which comprises a convoluted boot and an adapter ring integrally connected thereto. The adapter ring—in a cross-sectional view—comprises inner wall portions adapted to an outer joint part and a cylindrical outer wall portion. Between the inner wall portions and the cylindrical outer wall portion there are provided radially extending resilient ribs whose thickness approximately corresponds to the thickness of the wall portions.

EP 1 182 372 A2 shows a similar convoluted boot assembly which is integrally produced by blow molding and comprises a convoluted boot for being connected to a shaft and an adapter ring for being connected to an outer joint part. On its radial outside, the adapter ring comprises a cylindrical contour and, on its radial inside, a contour in the shape of three leaves which is adapted to the outer contour of the outer joint part. In the regions formed in such way with a radially greater wall thickness, there is provided a plurality of parallel slots in planes positioned perpendicularly to the longitudinal axis of the convoluted boot assembly.

BRIEF SUMMARY

It is an object of the present invention to provide a convoluted boot for sealing an annular gap between an outer joint part of a tripode joint and a shaft connected to an inner joint part of a tripode joint, which convoluted boot comprises good sealing properties, is easier to produce and features less distortion during the solidifying process.

To achieve the objective, there is proposed a convoluted boot which, for the purpose of sealing the annular chamber between an outer joint part of a tripode joint and a shaft connected to an inner joint part of the tripode joint comprises an elastic adapter ring for being attached to the outer joint part and an elastic boot portion which is integrally connected thereto and which extends between the adapter ring and a collar for being fixed on the shaft. The adapter ring comprises a cylindrical outer face and an inner face whose cross-section is adapted to the outer contour of the outer joint part and which is designed for being form-fittingly arranged on the outer joint part. At least in partial regions of the adapter ring there is provided a plurality of holes which start from an end face of the adapter ring and are arranged to form a honeycomb structure, wherein at least in one radial section, at least two holes are arranged radially adjacent to one another.

Such a convoluted boot is advantageous in that even in the region of a radial thickening between the inner face and the outer face of the adapter ring, an accumulation of material does not occur. In this way it is possible to minimize the risk of the formation of shrink holes when cooling the injection-molded adapter ring, and the degree of distortion due to shrinkage is very slight. Furthermore, the inventive adapter ring is radially elastically resilient, so that by tightening a tensioning strip also in the region of the thickening, the inner face rests effectively sealingly against the clover-leaf shaped outer face of the outer joint part and is loaded radially inwardly. Furthermore, the holes in the structure are advantageous in that, in said regions provided with holes, the adapter ring comprises a high degree of stiffness as compared to an adapter ring with ribs.

According to a preferred embodiment, the holes extend parallel to the longitudinal axis of the convoluted boot. The holes are preferably provided in the form of blind holes and the boot portion is connected to the adapter ring radially in the region of the outer face of the adapter ring. This is advantageous in that a blow-molded or injection molded boot portion can be designed to be rotationally symmetrical with a circular-cylindrical cross-section in the region of attachment to the adapter ring. Thus, any stresses in the boot portion are uniformly distributed when the tripode joint is in operation. For certain applications it is proposed that the holes extend down to nearly the entire axial depth of the adapter ring. The holes can be provided in the form of through-holes, and the boot portion can be connected to the adapter ring radially in the region of the inner face of the adapter ring. According to a further embodiment it is proposed that, at least in a radial section through the adapter ring, at least two holes are arranged on circles with different radii so as to adjoin one another. More particularly, three and more holes can be arranged so as to radially adjoin one another. In this way it is ensured that the regions with radial thickening comprise particularly high stiffness values.

According to a second solution, it is possible to provide a convoluted boot with a longitudinal axis which serves to seal an annular chamber between an outer joint part of a tripode joint and a shaft connected to the inner joint part of a tripode joint. The convoluted boot includes an elastic adapter ring adapted to be attached to the outer joint part, and an elastic boot portion which is connected thereto and which extends between the adapter ring and a collar for being fixed on the shaft. The adapter ring comprises a cylindrical outer face and an inner face whose cross-section is adapted to the outer contour of the outer joint part and which is designed to be form-fittingly arranged on the outer joint part. At least in partial circumferential regions of the adapter ring, there is provided a plurality of holes which start from an outer face of the adapter ring and are arranged to form a honeycomb structure. This embodiment has the same advantages as respect of stiffness as the previously mentioned embodiment.

According to further aspects of the invention, it is proposed that the holes extend radially relative to the longitudinal axis. They have approximately identical cross-sections and are substantially uniformly distributed and packed uniformly densely. The holes can be provided in the form of blind holes so that the joint chamber is sealed, so that no lubricant can escape from, or dirt enter, the joint chamber. The boot portion is preferably rotation-symmetrical and connected to the adapter ring radially in the region of the outer face. To keep the regions with a greater accumulation of mass small, it is proposed that the holes of the adapter ring extend radially nearly as far as the inner face.

According to further embodiments of each of the foregoing embodiments, i.e. one with holes which start from the end face and one with holes which start from the outer face, the holes in the adapter ring can be slightly conical in shape. This simplifies the process of removing the mold used for injection or blow molding. The holes can comprise a round or elliptical or even a polygonal, more particularly a hexagonal cross-section. All of the holes can be the same size and shape, or different. A hexagonal cross-section is advantageous in that the wall formed between adjoining holes comprises a constant thickness. In this way it is ensured that, in the region of the holes, the adapter ring comprises a uniform strength. The holes are preferably arranged side by side with a maximum packing thickness, with a supporting web being formed between each two adjoining holes.

A further solution for the above-mentioned object is provided by a convoluted boot having a longitudinal axis and serving to seal an annular chamber between an outer joint part of a tripode joint and a shaft connected to an inner joint part of the tripode joint, comprising an elastic adapter ring to be attached to the outer joint part and an elastic boot portion which is connected thereto and which extends between the adapter ring and a collar for being fixed on the shaft. The adapter ring comprises a cylindrical outer face and inner face whose cross-section is adapted to the outer contour of the outer joint part and which is designed to be form-fittingly arranged on the outer joint part. At least in partial circumferential regions of the adapter ring, there is provided a plurality of pore shaped cavities. The convoluted boot has the same advantages as the above-mentioned convoluted boots with a plurality of holes in the adapter ring.

The cavities can comprise approximately identical diameters and be substantially uniformly distributed. More particularly, it is proposed that the cavities are arranged in the closest possible packing density, so that the adapter ring comprises particularly high stiffness values in those regions with radial thickening. According to another embodiment, the cavities are closed on all sides, so that the adapter ring sealingly closes the annular chamber of the joint and that no lubricant can escape outwardly. According to an alternative embodiment it is proposed that the cavities are at least partially designed so as to have open pores relative to one another, with at least one of the two end faces and at least one of the two circumferential faces being closed and pore-free. In this way it is also ensured that the annular chamber of the joint is sealingly closed.

According to a further embodiment of the invention, the adapter ring and the boot portion, according to the above-mentioned solutions, are produced so as to be integral, i.e. form one piece. The adapter ring and the boot portion can be made of a thermoplastic elastomer. According to an alternative embodiment, the adapter ring and the boot portion are produced in the form of two parts which are subsequently connected to one another. The two components can be connected by conventional form-fitting or material-locking joining process, more particularly gluing or welding. The adapter ring and the boot portion are preferably produced from a thermoplastic elastomer, with other material combinations, for example rubber for the adapter ring and a thermoplastic elastomer for the boot portion not being excluded.

BRIEF DESCRIPTION OF THE DRAWINGS

Several embodiments of the invention are illustrated in the drawings and will be described below.

DETAILED DESCRIPTION

Figure 1:
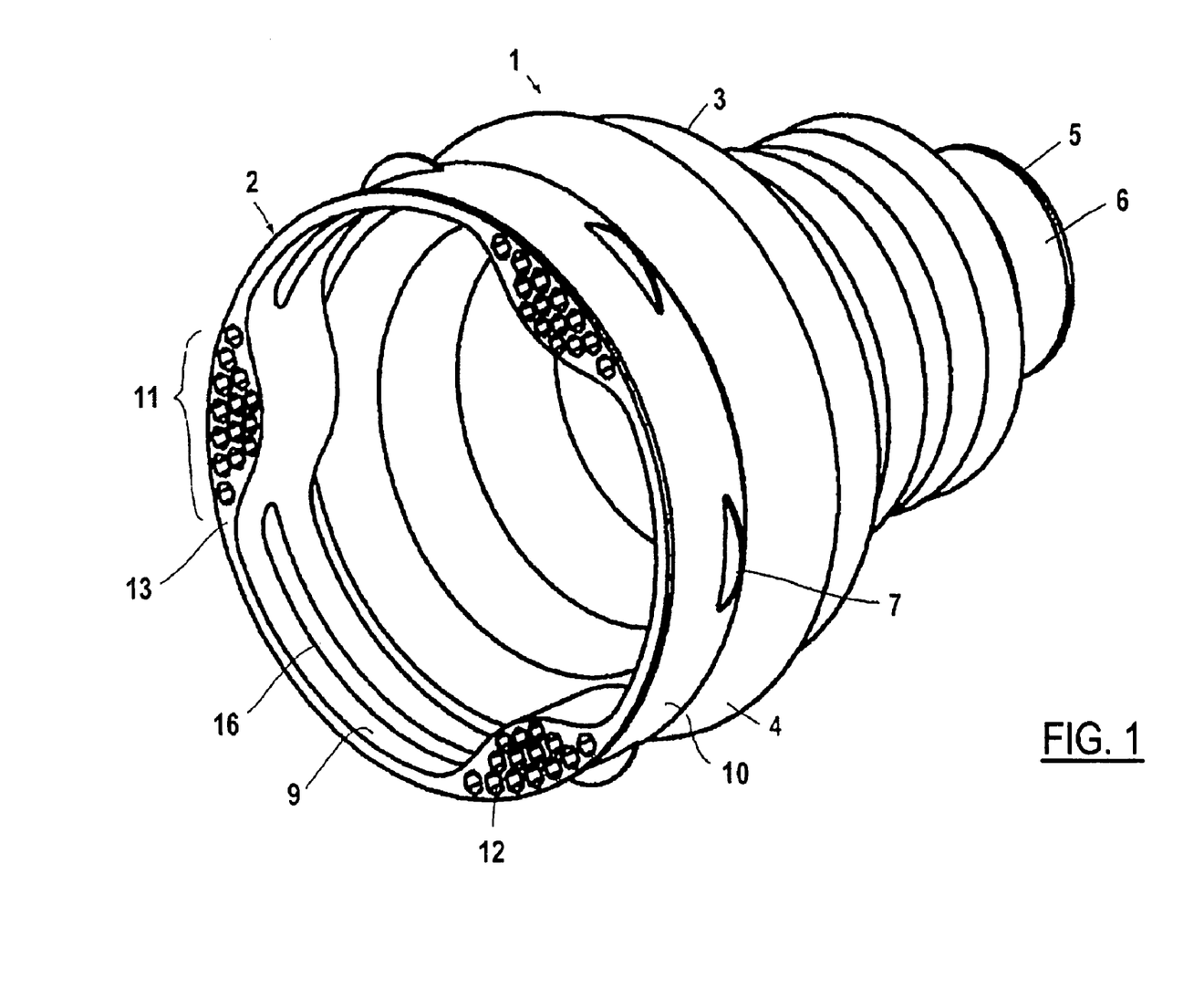
FIG. 1 shows an inventive convoluted boot in a first embodiment in a perspective view.
Figure 2:
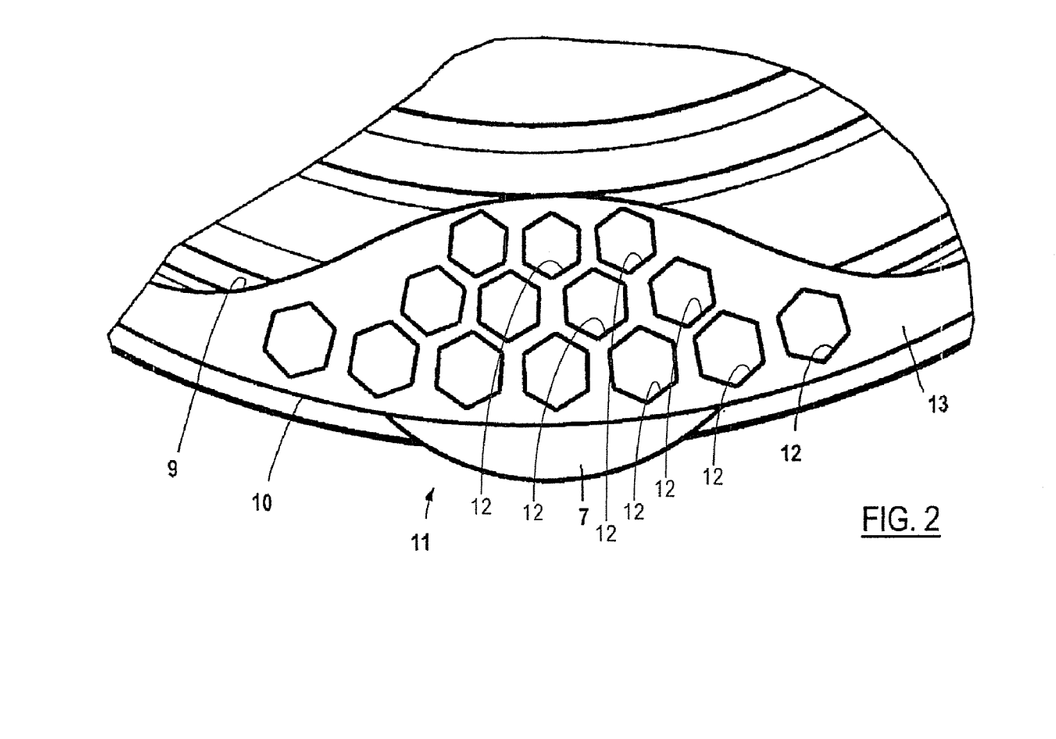
FIG. 2 shows part of the convoluted boot according to FIG. 1 in an axial view of the adapter ring.
Figures 2A, 2B:
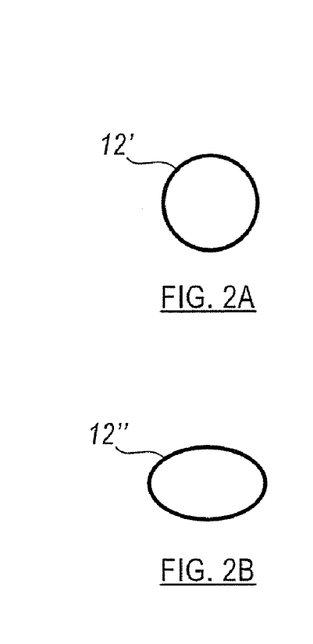
FIG. 2A is a partial cross sectional view of an alternative illustration of one of the holes of the adapter ring in FIG. 2.
FIG. 2B is a partial cross sectional view of another alternative illustration of one of the holes of the adapter ring in FIG. 2.
Figure 2C:
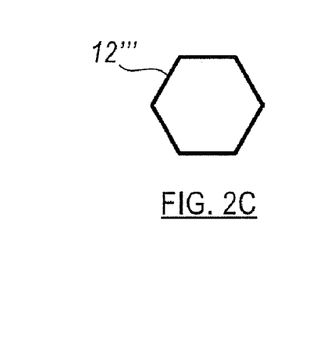
FIG. 2C is a partial cross sectional view of another alternative illustration of one of the holes of the adapter ring in FIG. 2.
Figure 3:
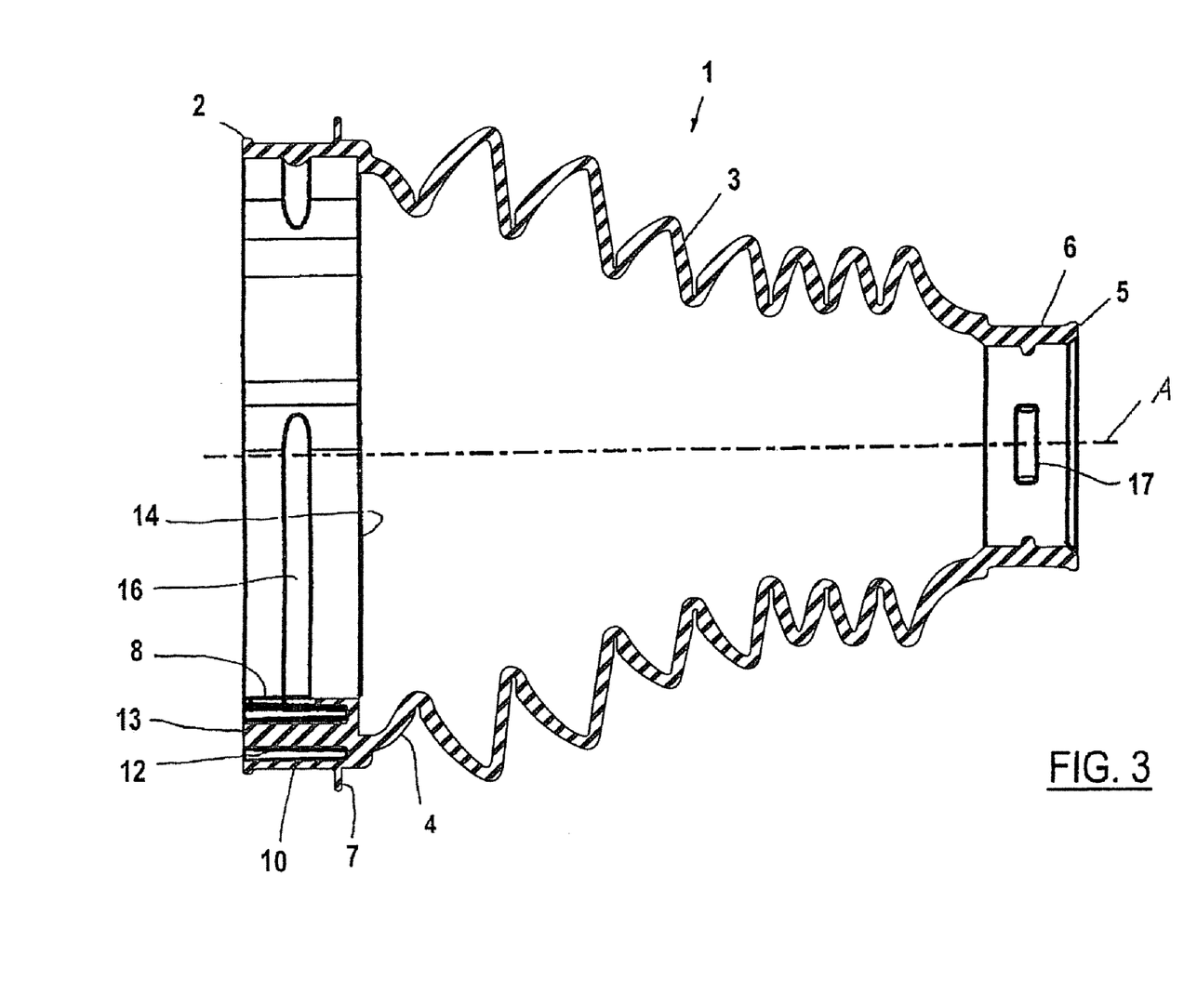
FIG. 3 shows the convoluted boot according to FIG. 1 in a longitudinal section.

FIGS. 1, 2 and 3 which will be described jointly below show a convoluted boot which comprises an adapter ring 2 and a convoluted boot portion 3. The adapter ring 2 and the boot portion 3 are produced so as to form one piece and are made of an elastic material, more particular of thermoplastic or elastomer plastics. The convoluted boot 1 serves to seal the joint chamber of a tripode joint (not illustrated) which comprises an outer joint part whose outer contour is clover-leaf shaped in a cross-sectional view, an inner joint part which engages the outer joint part, as well as a tripode and roller assemblies. For torque transmitting purposes, a shaft is inserted into the tripode. The joint chamber between the outer joint part and the shaft is bridged by the boot portion 3 which is rotationally symmetrical. A first annular fold 4 of the boot portion 3 is connected to the adapter ring 2. A collar 5 is sealingly positioned on the shaft, with an inner radial, partially continuous annular bead 17 being able to engage a corresponding annular groove of the shaft for axial fixing purposes. For fixing the collar 5 on the shaft, there is provided an annular groove 6 which can be engaged by a tensioning strip (not illustrated).

On its radial outside, the adapter ring 2 comprises a cylindrical outer face 10 with uniformly, circumferentially distributed radial projections 7 which can be contacted by a tensioning strip (again not illustrated) for fixing the adapter ring 2 on the outer joint part. On its radial inside, the adapter ring 2 comprises an inner face 8 with a partially continuous annular bead 16 which is able to engage a corresponding annular groove in the outer face of the outer joint part. The cross-section of the inner face 8 is adapted to the outer contour of the outer joint part, so that the adapter ring 2 can be sealingly slipped on the outer joint part. As a result of this design, the adapter ring 3 comprises uniformly alternately circumferentially distributed recesses 9 and thickened portions 11.

In order to avoid an accumulation of mass in the region of the thickening 11, which accumulation leads to non-uniform cooling of the adapter ring and thus to distortion, there are provided holes 12 which start from the radial face 13 and extend axially, with a plurality of holes being arranged so as to radially adjoin one another in a longitudinal plane. In one particular embodiment, referring to FIG. 2, at least three holes 12 are arranged on circles with different radii centered about an axis A-A (best seen in FIG. 3) so as to adjoin one another. The holes comprise approximately identical cross-sections and are substantially uniformly distributed and arranged generally parallel relative to one another with a high packing density, which, in this case, is referred to as a honeycomb-like structure. As is particularly evident from FIG. 3, the holes are provided in the form of blind holes, with the hole ends being at an axial distance from the radial face 14 facing the boot portion 3, so that the joint chamber is sealed relative to the outside. In order to ensure easy removal of the parts from the mold after the completion of the injection molding or blow molding operation, the holes 12 are slightly conical in their axial direction.

The inventive convoluted boot 1 with a honeycomb-like structure in the adapter ring 2 is advantageous in that excess accumulation of mass is reduced. In this way, it is ensured that any shrinkage or sink holes occurring during the cooling process and the resulting distortion are minimized and that weight is saved.

Furthermore, the adapter ring 2 with a honeycomb-like structure is relatively stiff as compared to an adapter ring with radial ribs and, as compared to a solid member, it comprises a high degree of elasticity. In this way, when the adapter ring 2 has been slipped on to the outer joint part, the inner face 8 sealingly rests against the outer face of the outer joint part around the entire circumference and is loaded radially inwardly.

Figure 4:
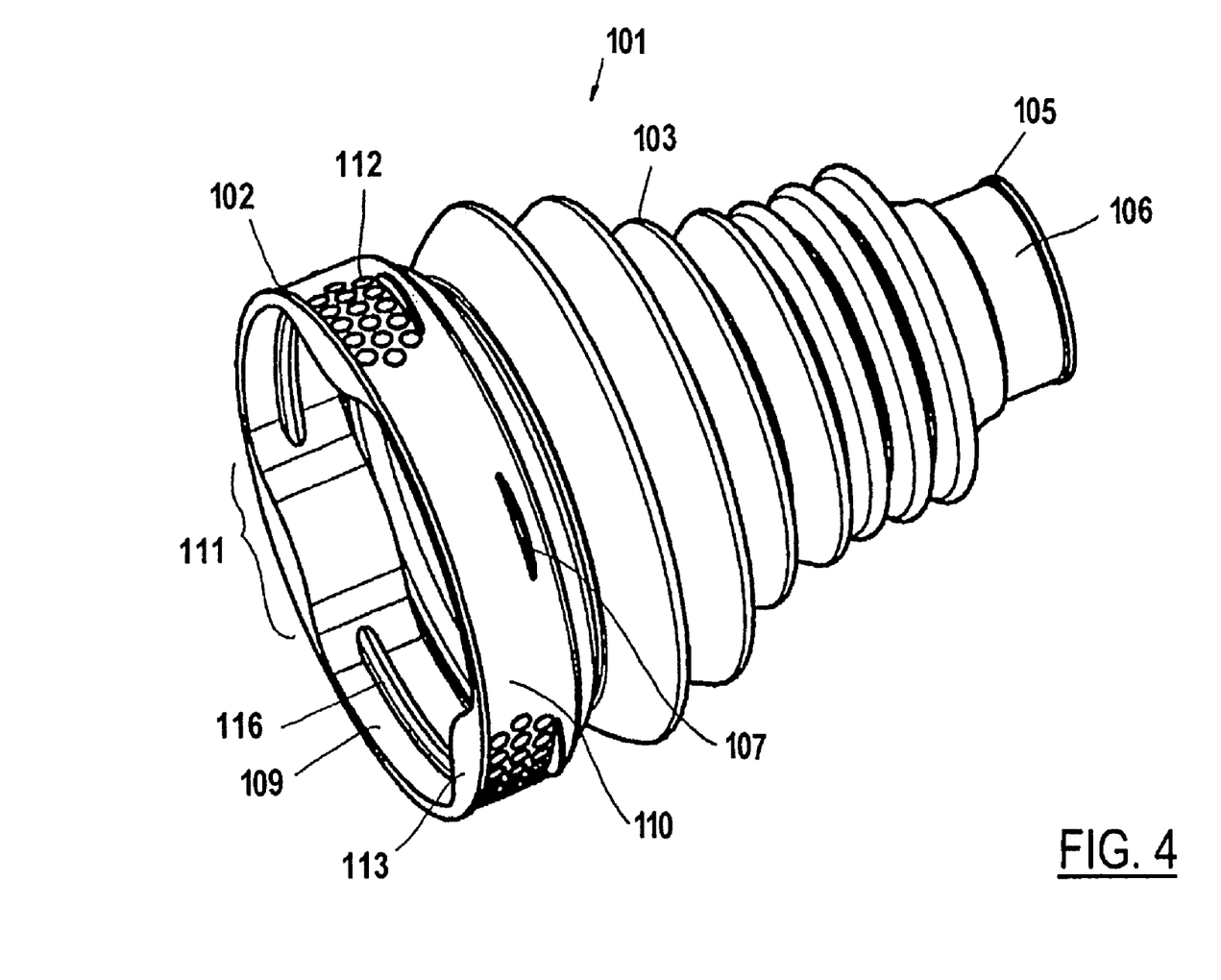
FIG. 4 is an inventive convoluted boot in a second embodiment in a perspective view.
Figure 5:
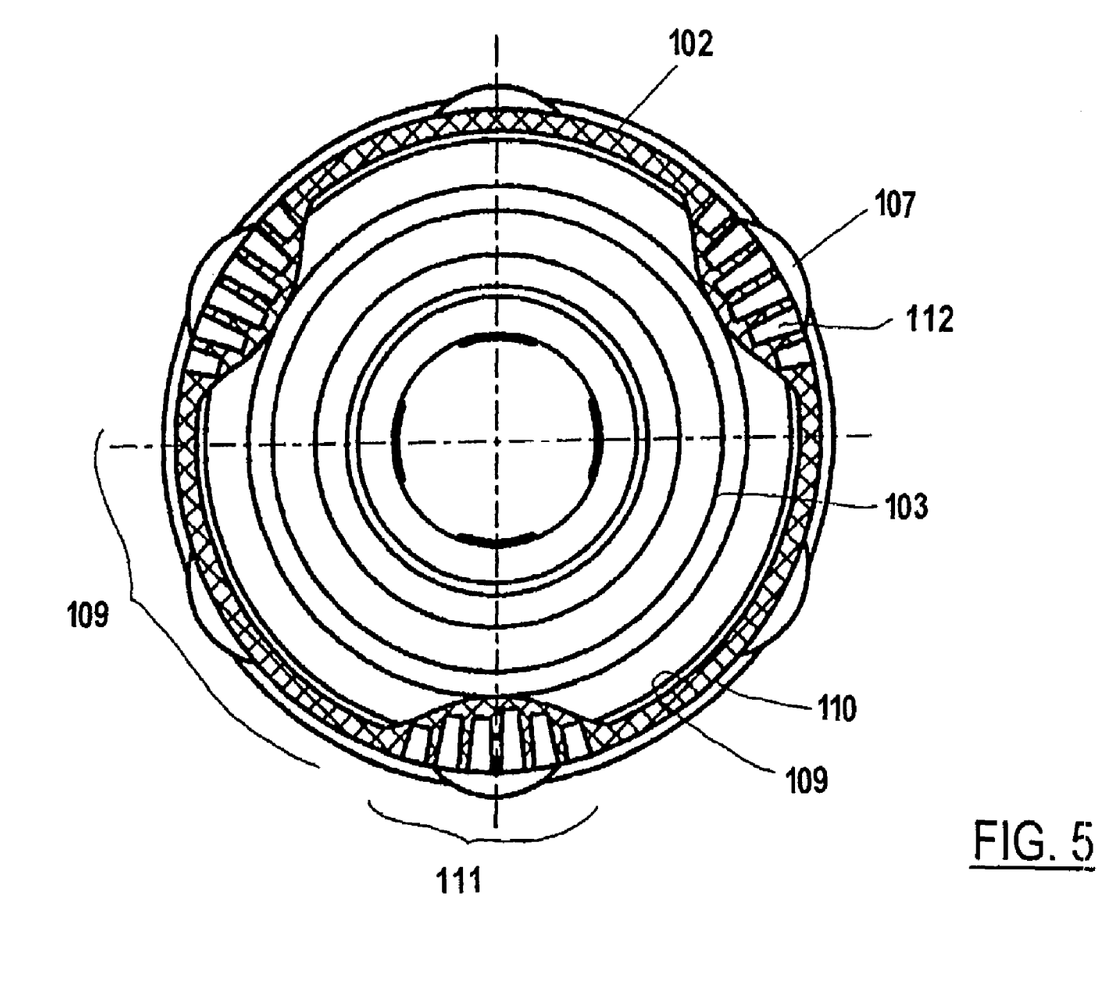
FIG. 5 shows the convoluted boot according to FIG. 4 in a cross-section through the adapter ring.

FIGS. 4 and 5 which will be described jointly below show a second embodiment of an inventive convoluted boot. Identical details have been given the same reference numbers as in FIGS. 1 to 3, indexed by 100. To that extent, reference is made to the above description of same. In contrast to the embodiment according to FIG. 1, the present adapter ring 102, in the region of its radially thickened portions 111, comprises holes 112 which start from the cylindrical outer face 110 and project radially inwardly. They comprise approximately the same cross-sections and are substantially uniformly distributed and are arranged with a high packing density relative to one another, so that they form a honeycomb-like structure. The holes 112 are provided in the form of blind holes, with the hole ends being positioned at a radial distance from the inner face 108 of the adapter ring 102, which is particularly evident from FIG. 5. The holes 112 comprise a round cross-section and are tapered radially inwardly. The conical shape ensures that the molding tools used for production purposes and having cores for forming the holes can easily be removed after the completion of the injection blow-molding or injection molding process, because the friction forces between the cores and the wall of the holes 112 are low. Said embodiment with radially extending holes 112 has the same advantages as the embodiment with axially extending holes according to FIGS. 1 to 3.

Figure 6:
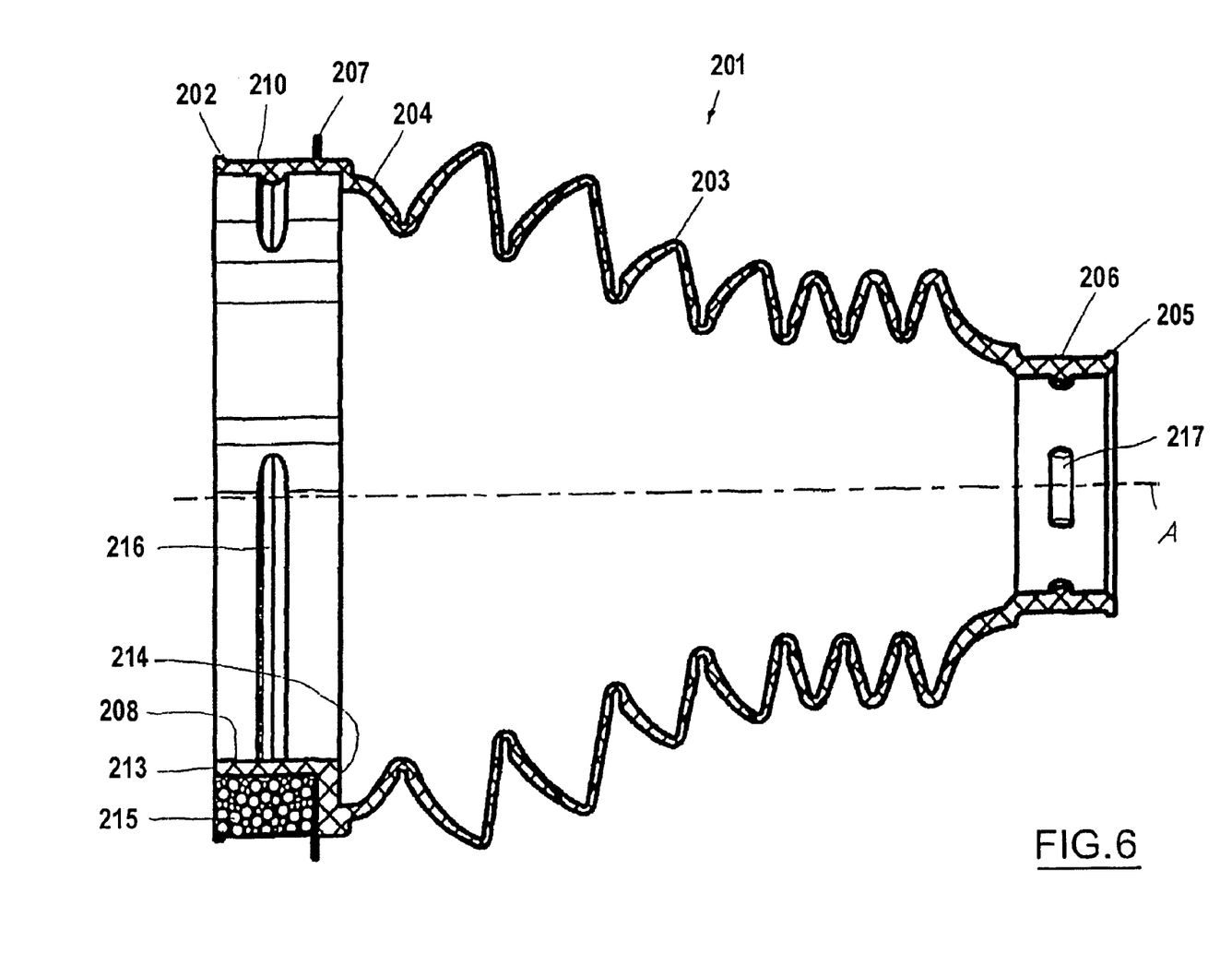
FIG. 6 shows a convoluted boot in a third embodiment in a longitudinal section.
Figure 7:
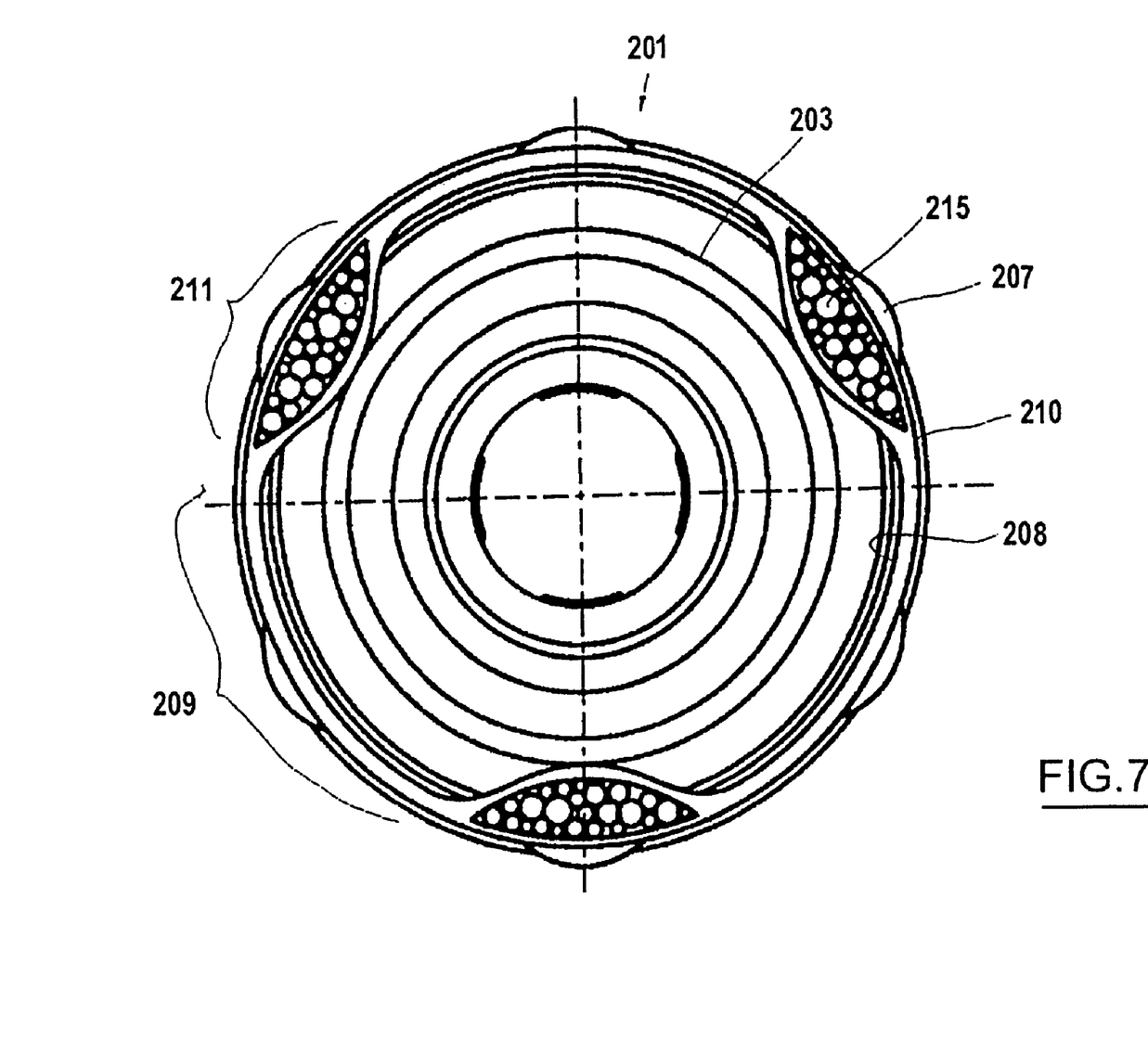
FIG. 7 shows the convoluted boot according to FIG. 6 in a cross-section through the adapter ring.

FIGS. 6 and 7 which will be described jointly below show a further embodiment of an inventive convoluted boot. Identical details have been given the same reference numbers as in FIG. 1 indexed by 200. To that extent reference is made to the above description. In contrast to the other embodiments, the present convoluted boot 201 comprises a plurality of pore-shaped cavities 215. The cavities 215 comprise substantially the same diameters and are arranged with a high packing density. It can be seen that the inner face 208, the outer face 210 and the radial face 214 of the adapter ring 202, which radial face 214 faces the boot portion 203, are pore-free and closed, so that the joint chamber is sealed relative to the outside and so that no dirt can enter, and no lubricant can escape. The inventive convoluted boot 201 with a foam-like structure in the region of the thickened portions 211 of the adapter ring 202 is advantageous in that excess accumulation of mass is reduced. In this way, it is ensured that any shrinkage or sink holes occurring during the cooling process and the resulting distortion are minimized and that weight is saved. Furthermore, the adapter ring 202 with a foam-like structure is relatively stiff as compared to an adapter ring with ribs. In this way, when the adapter ring 202 has been slipped on to the outer joint part, the inner face 208 sealingly rests against the outer face of the outer joint part around the entire circumference and is loaded radially inwardly.

The invention claimed is:

1. A convoluted boot defining a longitudinal axis and adapted to seal an annular chamber between an outer joint part of a tripode joint and a shaft connected to an inner joint part of the tripode joint, the boot comprising:
   an elastic adapter ring for attaching to the outer joint part; and
   an elastic boot portion integrally connected to the adapter ring and which extends between the adapter ring and a collar for fixing on the shaft,
   wherein the adapter ring comprises a cylindrical outer face and an inner face whose cross-section is adapted to an outer contour of the outer joint part and which is adapted to be form-fittingly arranged on the outer joint part, wherein the adapter ring comprises thickened portions distributed circumferentially, the thickened portions comprising a plurality of holes which start from an end face of the adapter ring and are arranged to form a honeycomb structure, wherein at least in one radial longitudinal section, at least two holes are arranged radially adjacent to one another.

2. A convoluted boot according to claim 1, wherein the holes extend parallel to the longitudinal axis.

3. A convoluted boot according to claim 2, wherein the holes are provided in the form of blind holes and wherein the boot portion is connected to the adapter ring radially in the region of the outer face of the adapter ring.

4. A convoluted boot according to claim 3, wherein the holes are defined by an open end and a closed end, and wherein the open end intersects a first radial face of the adapter ring and wherein the closed end is positioned adjacent a second radial face, but are spaced inwardly from the second radial face such that the holes extend an axial depth of the adapter ring that is greater than 50% of the axial depth of the adapter ring.

5. A convoluted boot according to claim 1, wherein, at least in one radial longitudinal section, at least three holes are arranged on circles with different radii centered about said axis so as to adjoin one another.

6. A convoluted boot according to claim 1, wherein the holes are slightly conical in shape.

7. A convoluted boot according to claim 1, wherein the holes comprise a round, elliptical or polygonal cross-section.

8. A convoluted boot according to claim 1, wherein the holes are uniformly distributed and packed with the same density.

* * * * *

UNITED STATES PATENT AND TRADEMARK OFFICE
CERTIFICATE OF CORRECTION

PATENT NO. : 7,607,986 B2
APPLICATION NO. : 10/557505
DATED : October 27, 2009
INVENTOR(S) : Markus Deisinger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 756 days.

Signed and Sealed this

Twelfth Day of October, 2010

David J. Kappos
*Director of the United States Patent and Trademark Office*